United States Patent
Aiello et al.

(10) Patent No.: US 9,372,493 B2
(45) Date of Patent: Jun. 21, 2016

(54) M2LC SYSTEM AND METHOD FOR CONTROLLING SAME

(71) Applicant: Benshaw, Inc., Pittsburgh, PA (US)

(72) Inventors: Marc Francis Aiello, Oakmont, PA (US); Kenneth Stephen Berton, Greensburg, PA (US); Walter Gilbert Barie, Allison Park, PA (US)

(73) Assignee: Benshaw, Inc., Pittsburgh, PA (US)

( * ) Notice: Subject to any disclaimer, the term of this patent is extended or adjusted under 35 U.S.C. 154(b) by 216 days.

(21) Appl. No.: 13/790,442

(22) Filed: Mar. 8, 2013

(65) Prior Publication Data

US 2013/0234681 A1  Sep. 12, 2013

Related U.S. Application Data

(60) Provisional application No. 61/608,759, filed on Mar. 9, 2012.

(51) Int. Cl.
| | | |
|---|---|---|
| *H02M 1/12* | (2006.01) | |
| *H02M 1/14* | (2006.01) | |
| *H02M 7/48* | (2007.01) | |
| *H02M 7/5387* | (2007.01) | |
| *G05F 3/08* | (2006.01) | |
| *H02M 7/483* | (2007.01) | |

(52) U.S. Cl.
CPC . *G05F 3/08* (2013.01); *H02M 1/12* (2013.01); *H02M 7/483* (2013.01); *H02M 2001/123* (2013.01); *H02M 2007/4835* (2013.01)

(58) Field of Classification Search
USPC ............ 323/242; 363/40, 41, 65, 71, 72, 132
See application file for complete search history.

(56) References Cited

U.S. PATENT DOCUMENTS

| | | | |
|---|---|---|---|
| 4,924,373 A | 5/1990 | Inaba et al. | |
| 6,301,130 B1 * | 10/2001 | Aiello et al. | ................... 363/37 |
| 6,545,452 B2 | 4/2003 | Bruckmann et al. | |

(Continued)

FOREIGN PATENT DOCUMENTS

| | | |
|---|---|---|
| DE | 10031778 | 1/2002 |
| WO | 2007028349 | 3/2007 |
| WO | WO 2009/086927 A1 | 7/2009 |

OTHER PUBLICATIONS

Alves, et al., "Medium Voltage Industrial Variable Speed Drives", WEG AUTOMAçÂO, Brazil, 2009.

(Continued)

*Primary Examiner* — Adolf Berhane
*Assistant Examiner* — Gary Nash
(74) *Attorney, Agent, or Firm* — Reinhart Boerner Van Deuren P.C.

(57) ABSTRACT

A modular multilevel converter system. The system includes a plurality of series connected two-terminal M2LC cells arranged into at least two output phase modules. A first one of the output phase modules has an inductance and an effective capacitance associated therewith. The first one of the output phase modules is configured so that a natural resonant frequency of the inductance with the effective capacitance of the first one of the output phase modules is greater than at least one of the following: an operating frequency of the first one of the output phase modules; a switching frequency of the first one of the output phase modules; and a switching frequency of any of the M2LC cells of the first one of the output phase modules.

16 Claims, 9 Drawing Sheets

(56) References Cited

U.S. PATENT DOCUMENTS

| | | | |
|---|---|---|---|
| 7,269,037 | B2 | 9/2007 | Marquardt |
| 7,518,886 | B1 | 4/2009 | Lai et al. |
| 7,577,008 | B2 | 8/2009 | Hiller |
| 7,835,166 | B2 | 11/2010 | Hiller |
| 7,924,585 | B2 | 4/2011 | Sommer |
| 2004/0146101 | A1 | 7/2004 | Pearce |
| 2008/0205093 | A1 | 8/2008 | Davies et al. |
| 2008/0219036 | A1 | 9/2008 | Colombi et al. |
| 2008/0232145 | A1 | 9/2008 | Hiller et al. |
| 2008/0259661 | A1* | 10/2008 | Hiller et al. ............ 363/71 |
| 2009/0206666 | A1 | 8/2009 | Sella et al. |
| 2009/0274051 | A1 | 11/2009 | Boswell et al. |
| 2010/0020581 | A1 | 1/2010 | Mazzola et al. |
| 2010/0328977 | A1* | 12/2010 | Asplund ............ 363/131 |
| 2011/0002149 | A1 | 1/2011 | Hiller et al. |
| 2011/0018481 | A1* | 1/2011 | Hiller ............ 318/400.26 |
| 2011/0019442 | A1 | 1/2011 | Yamada et al. |
| 2011/0049994 | A1 | 3/2011 | Hiller et al. |
| 2011/0089873 | A1 | 4/2011 | Blöcher et al. |
| 2012/0068555 | A1* | 3/2012 | Aiello et al. ............ 307/115 |

OTHER PUBLICATIONS

Song, et al., "Multilevel Optimal Modulation and Dynamic Control Strategies for STATCOMs Using Cascaded Multilevel Inverters", IEEE Transactions on Power Delivery, vol. 22, No. 3, Jul. 2007, pp. 1937-1946.

Lesnicar, et al., "An Innovative Modular Multilevel Converter Topology Suitable for a Wide Power Range", Power Tech Conference Proceedings, 2003, IEEE Bologna, vol. 3, Jun. 2003, pp. 1-6.

Allebrod, et al., "New Transformerless, Scalable Modular Multilevel Converters for HVDC-Transmission", IEEE; 2008; pp. 174-179.

Glinka, "Prototype of Multiphase Modular-Multilevel-Converter with 2MW power rating and 17-level-output-voltage", Power Electronics Specialist Conference, 2004 IEEE, vol. 4, pp. 2572-2576.

Marquardt, et al., "New Concept for High Voltage—Modular Multilevel Converter PESC 2004 Conference in Aachen, Germany", 2004.

Glinka, et al., "A New AC/AC Multilevel Converter Family", IEEE Transactions on Industrial Electronics, vol. 52, No. 3, Jun. 2005, pp. 662-669.

Vandermeulen et al, "The Reliability of Neural Point clamped v. Cascaded H-Bridge Inverters", White Paper TD02000001E, Eaton, Oct. 2009; http://www.eaton.com/ecm/groups/public/@pub/@electrical/documents/content/td02000001e.pdf.

Andreja Rašić et al.; Optimization of the Modular Multilevel Converters Performance using the Second Harmonic of the Module Current; 13th European Conference on Power Electronics and Applications, 2009: EPE '09; Sep. 8-10, 2009; Barcelona, Spain, IEEE, Piscataway, NJ USA; Sep. 8, 2009; 10 pages, XP031541462, ISBN: 978-14244-4432-8.

Hirofumi Akagi et al.: Control and Performance of a Transformerless Cascade PWM Statcom With Star Configuration; IEEE Transactions on Industry Applications, IEEE Service Center, Piscataway, NJ US; vol. 43, No. 4, Jul. 1, 2007; pp. 1041-1049; XP011187777, ISSN: 0093-9994, DOI: 10.1109/TIA.2007.900487.

\* cited by examiner $$saP_k := cell0pA_k + cell1pA_k + cell2pA_k + cell3pA_k + cell4pA_k + cell5pA_k$$

$$saN_k := cell0nA_k + cell1nA_k + cell2nA_k + cell3nA_k + cell4nA_k + cell5nA_k$$

$$Isa_k := \frac{(saN_k - saP_k)}{2} \cdot ioa_k$$

$$ic_0 := 0 \quad dic_0 := 0$$

$$\begin{pmatrix} dic_{k+1} \\ ic_{k+1} \end{pmatrix} := \begin{pmatrix} 1 - \dfrac{R \cdot \delta}{L} & \dfrac{-\delta \cdot N}{2 \cdot LC} \\ \delta & 1 \end{pmatrix} \cdot \begin{pmatrix} dic_k \\ ic_k \end{pmatrix} + \begin{pmatrix} \dfrac{\delta}{2 \cdot L \cdot C} \\ 0 \end{pmatrix} \cdot Isa_k$$

$$iarm_k := ic_k + \frac{1}{2} ioa_k$$

$$fr := \frac{\sqrt{\dfrac{1}{2 \cdot L \cdot \dfrac{C}{N}}}}{2 \cdot \pi} \quad fr = 929.265$$

FIG. 4

$\Omega = 1$

HVF = 0.028
FUNDAMENTAL_saN = 1.179

$\dfrac{vcp\_p}{Vbus} = 1.183$

HVF = 1.716 x 10⁻³
FUNDAMENTAL_saN = 1.179

$\frac{vcp\_p}{Vbus} = 1.117$

M2LC SYSTEM AND METHOD FOR CONTROLLING SAME

CROSS-REFERENCE TO RELATED APPLICATION

This application claims the benefit under 35 U.S.C. §119(e) of the earlier filing date of U.S. Provisional Patent Application No. 61/608,759 filed on Mar. 9, 2012.

BACKGROUND

This application discloses an invention which is related, generally and in various embodiments, to a Modular Multilevel Converter (M2LC) system and a method for controlling the M2LC system.

FIG. 1 illustrates an exemplary Multilevel Modular Converter (M2LC) system. The M2LC system includes a plurality of two-level M2LC cells (subsystems) arranged as output phase modules (e.g., Phase A, Phase B and Phase C), where each output phase module includes a plurality of series-connected two-level M2LC cells. The representative M2LC cell shown in FIG. 1 is a two-level M2LC cell which includes two switching devices, two diodes, a capacitor and two terminals. The two switching devices can be controlled such that one of two different potentials (e.g., zero volts or $V_{cap}$) may be present across the two terminals. As shown in FIG. 1, the respective output phase modules are arranged into a positive arm (an "N" level positive arm) connected to a positive DC bus (+ Bus) and a negative arm (an "N" level negative arm) connected to a negative DC bus (− Bus), where "N" equals the number of two-level M2LC cells in a given arm. The "N" two level M2LC cells produce N+1 arm voltage levels with respect to the positive or negative DC bus. For the Phase A positive arm, the individual M2LC cells may be designated as 0 pA, 1 pA and (N−1)pA. Similarly, for the Phase A negative arm, the individual M2LC cells may be designated as 0 nA, 1 nA and (N−1)nA. For a given output phase module, the positive and negative arms may be separated by an inductor.

The M2LC system is a relatively new voltage source bridge topology with performance similar to that of so called Cascaded H bridge topologies in regards to output voltage quality and availability, but without the need of being tethered to a complicated rectified multi-winding transformer. The resultant DC bus of the M2LC system however is unlike traditional voltage source converters in that currents that flow are continuous and the DC bus itself in immune to high inductance, resonance, and catastrophic bus fault conditions since the energy storage is resident to each series connected M2LC cell.

For the M2LC system shown in FIG. 1 (supplied from a DC source), the general control or modulation goal is to control the switching devices in the M2LC cells to produce the desired output voltage so that the sum of the M2LC cell output voltages in any positive or negative arm in a given output phase module always sums to the VDC supply voltage.

Existing M2LC systems typically size the inter-arm inductor sufficiently large (typically 3-5% of system size) to filter unwanted current harmonics ($>=2^{nd}$ harmonic) which are produced in the arms during the modulation to develop the desired fundamental output voltage. These large inductors are typically made from standard electrical grade steel and thus are usually large and heavy as well as possess significant magnetic and conductor losses. Also, a relatively low resonate frequency results in relation to their high value of inductance in resonance with the effective value of phase capacitance which is formed by the series connection of the filter capacitors of the M2LC cells. Due to switch function, the value of this phase capacitance is constant regardless of operating point and depends on the number of series M2LC cells together with the value of the filter capacitance. The switch function of a given M2LC cell shown in FIG. 1 is a function which represents a value "1" when the M2LC cell produces a voltage of "$V_{cap}$" between its two output terminals and a value "0" when the M2LC cell produces a short circuit condition between its two output terminals.

As a result, the value of this resonance has typically been close to or below both the operating output frequency and switching frequency of the M2LC cells. This requires the need for control systems to control the average value of the capacitor voltages over time and to control the potential for resonate conditions in the arm currents which can be excited by the operating and/or switching frequency of the M2LC cells. Additionally, these low resonate frequencies make it difficult and in-effective to control the ripple voltage of the cell filter capacitors at low operating frequencies and high output currents which is a condition usually required for most motor drive applications of the M2LC topology.

Traditional M2LC topologies size the inductor large enough to filter a majority of the harmonic current generated in the arm but as a result cause the resonate frequency of the phase or arms to be much lower than the switching frequency of the M2LC cells in the phase. As described hereinafter, this can be shown to cause a large component of the fundamental output current to flow in the cell filter capacitors and hence produce very large values of capacitor voltage ripple to occur at low operating frequencies.

One method suggested recently to control these high ripple voltages has been to add a common mode signal to the reference signals generating the desired output voltage. With low values of resonance, this common mode signal must also be as low or lower in frequency to have any meaningful effect. This signal also significantly interferes with the quality of the desired output voltage waveform when it is added or injected to limit this ripple voltage. Also, the ability to trade-off or control the ripple voltage on the filter capacitors of the M2LC cells at low output frequencies with the need to develop and control the magnitude of the desired output voltage as the desired output frequency increases can only be controlled by the magnitude of the added or injected common mode signal. This type of compensation can be very nonlinear, significantly affect the desired value of fundamental output voltage and introduce significant output distortion.

BRIEF DESCRIPTION OF THE DRAWINGS

Various embodiments of the invention are described herein in by way of example in conjunction with the following figures, wherein like reference characters designate the same or similar elements.

FIG. 4 illustrates a $2^{nd}$ order dynamical equation which describes the response of an arm current of the M2LC system of FIG. 2;

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
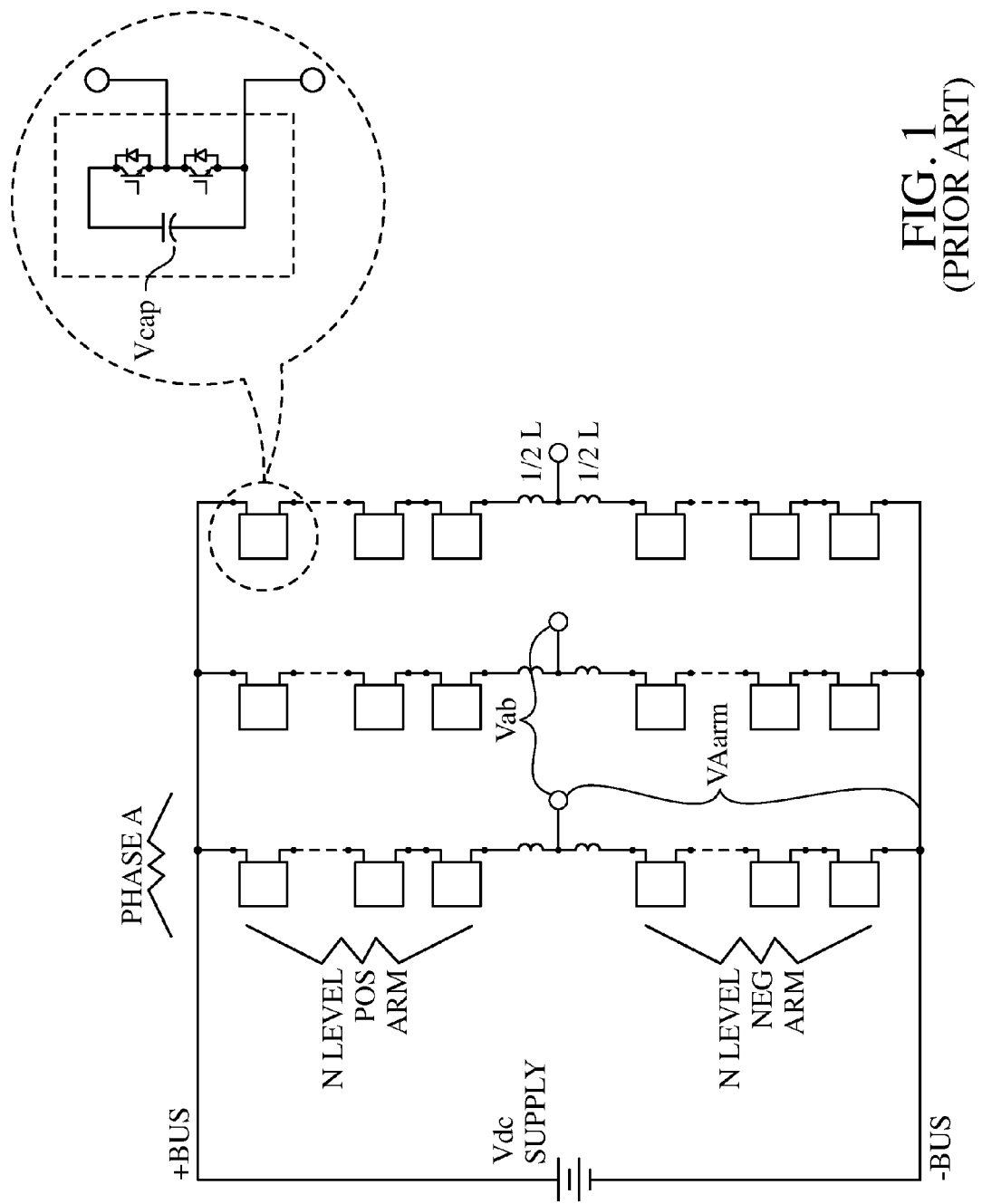
FIG. 1 illustrates an exemplary Multilevel Modular Converter (M2LC) system.
Figure 2:
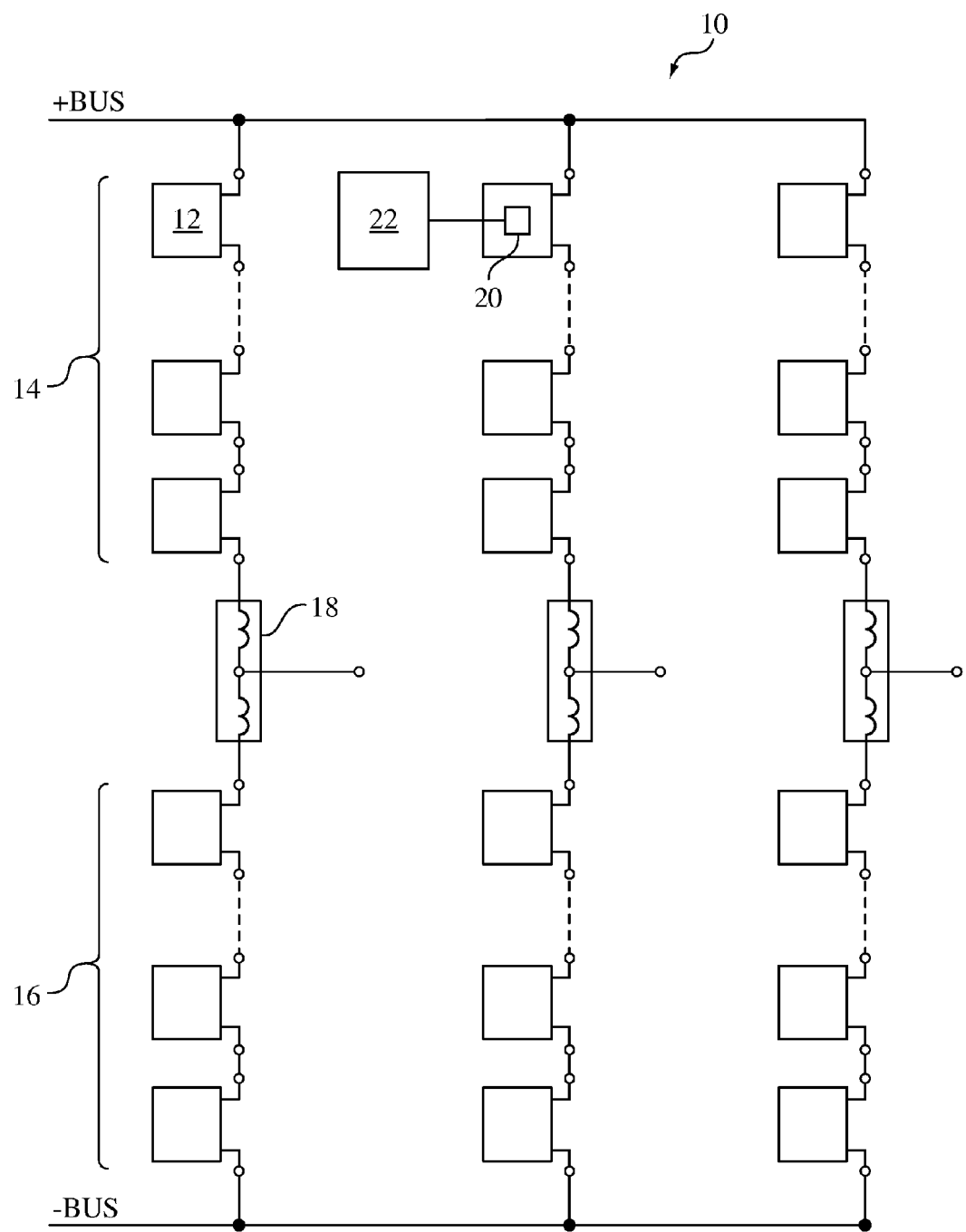
FIG. 2 illustrates various embodiments of an M2LC system.

FIG. 2 illustrates various embodiments of an M2LC system 10 having a plurality of M2LC cells 12. The M2LC system 10 is similar to the M2LC system of FIG. 1 in that the M2LC cells 12 are arranged as output phase modules, with each output phase module further arranged into a positive arm 14 and a negative arm 16, and a given output phase module defines an inductance and a capacitance for that output phase module. However, as explained in more detail hereinafter, in contrast to the M2LC system of FIG. 1, the output phase modules are configured so that for a given output phase module, a natural resonant frequency of the inductance with the effective capacitance of the output phase module is greater than the operating frequency of the output phase module, the switching frequency of the output phase module, and the switching frequency of any of the M2LC cells 12.

The inductance of a given output phase module may be realized deterministically in any number of different ways. For example, according to various embodiments, the inductance may be realized deterministically by including a deterministically sized inductive filter 18 between the positive and negative arms 14, 16. Also, although the inductive filter 18 is shown as having two inductors connected between the positive and the negative arms 14, 16 of an output phase module, it will be appreciated that the inductive filter 18 may include any number of inductors (e.g., one, two, three, four, etc.) connected between the positive and the negative arms 14, 16 of an output phase module.

As further shown in FIG. 2, the M2LC system 10 may also include a local control module 20 and a system control module 22. Although not shown for purposes of simplicity, it will be appreciated that the local control module 20 is communicably connected to the switching devices of the M2LC cell 12. Furthermore, although only one local control module 20 is shown in FIG. 2, it will be appreciated each of the M2LC cells 12 may include their own respective local control modules 20. The system control module 22 controls the M2LC cell switching functions and is communicably connected to the local control module 20. For purposes of simplicity, the system control module 22 is shown in FIG. 2 as only being communicably connected to one local control module 20. However, it will be appreciated that the M2LC system 10 may include a plurality of local control modules 20 and the system control module 22 may be communicably connected to the plurality of local control modules 20. The functionality of the system control module 22 will be described in more detail hereinbelow.

Figure 3:
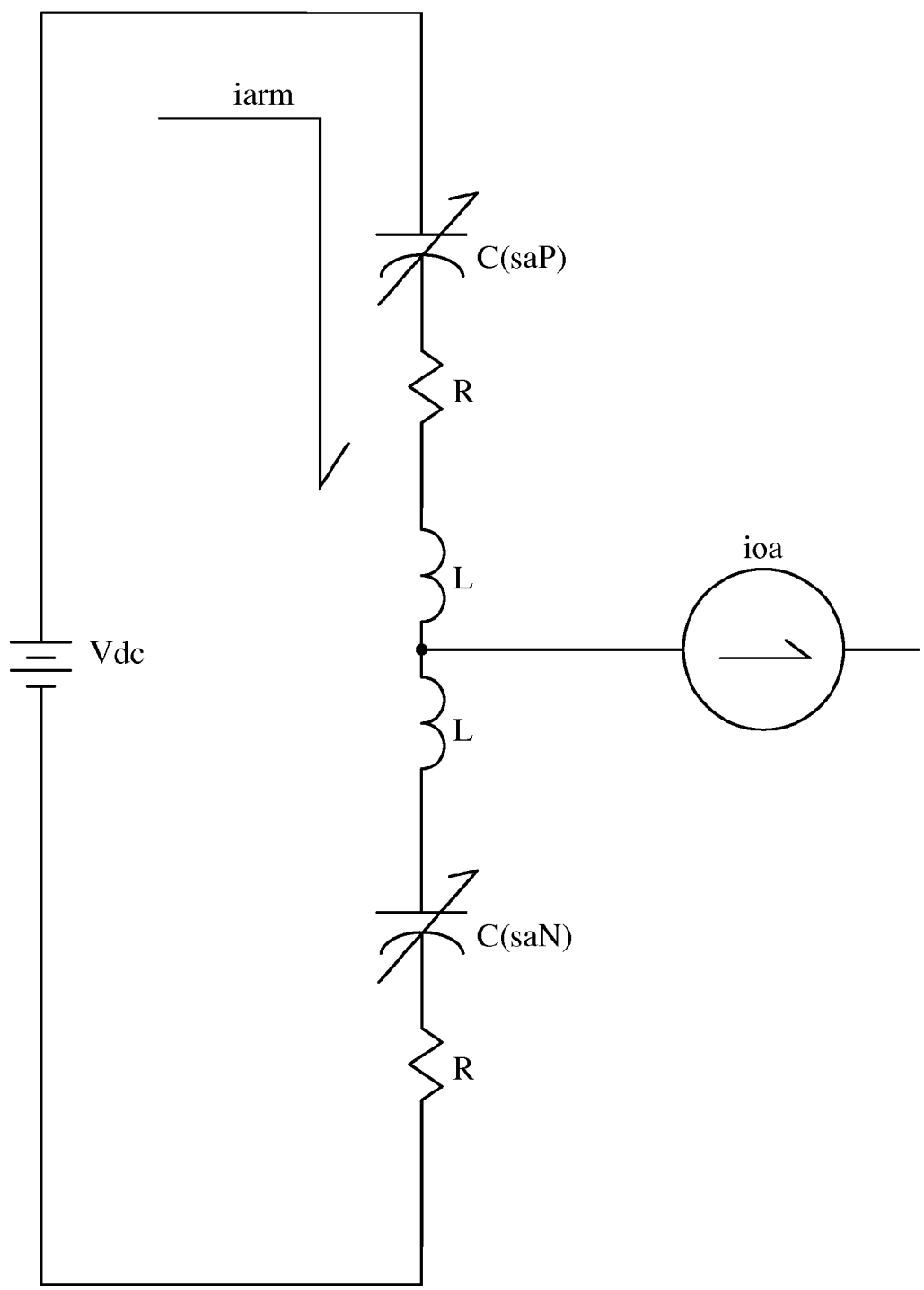
FIG. 3 illustrates a representation of the dynamics of any given phase of the M2LC system of FIG. 2.

FIG. 3 illustrates a representation of the dynamics of any given phase of the M2LC system 10 of FIG. 2. A current source (output current $i_{oa}$) is shown connected to the output which causes current to flow from both the positive and negative arms. The dynamics of the resulting arm current (iarm) can be shown to be a function of this defined output current and the switching function of the M2LC cells 12 can be shown to be influenced or filtered solely by the effective inductance (L), Resistance (R) and effective phase capacitance (C). In the case of the latter, the effective phase capacitance always looks like a constant when the capacitance functions of each arm are summed. Stated differently, the effective phase capacitance for a given phase is equal to the following equation:

$$\frac{1}{\frac{1}{C(saP)} + \frac{1}{C(saN)}}$$

where saP is the sum of the switching functions of the positive arm and saN is the sum of the switching functions of the negative arm. It can thus be shown that the complete dynamics of the phase can be modeled using the $2^{nd}$ order dynamical equation shown in FIG. 4, where $Isa_k$ is the arm current forcing function, the state variable $ic_k$ represents the inductor current and fr is the resonance of the phase or pole.

In view of FIG. 4, it will be appreciated that the resonant frequency may be controlled by the selection of M2LC cell capacitance C and arm inductance ½ L. As described in more detail hereinafter, by sizing the value of L to be sufficiently small so as to result in a resonant frequency greater than the switching frequency of the M2LC cells, certain modulation techniques may be utilized to cancel this voltage ripple at low output operating frequencies or alternatively allow the size of the filter capacitors to be reduced at normal operating frequencies. Additionally, with this approach, the use of large, costly, heavy iron/copper based inductors may be eliminated in favor of small light weight powered iron based arm filters. The trade-off resulting in slightly higher rated switching devices to offset the elevated arm currents is a cost effective compromise with today's IGBT based switch technology.

In view of the information associated with FIGS. 3 and 4, the size of the inter-arm inductors should be sufficiently small in relation to the value of the cell filter capacitors so that the resonant frequency is sufficiently higher than the desired fundamental output frequency, the fundamental M2LC arm frequency, or the switching frequency of the M2LC cells 12 which are modulated to develop the desired output voltage and frequency of the M2LC system 10.

In further view of the information associated with FIGS. 3 and 4, the method used to develop the common mode switching condition required to cancel the fundamental capacitor currents should be completely independent of the reference signals used to produce the desired output voltage waveform, and the degree of this cancellation can be controlled as required to limit the value of capacitor ripple voltage without effecting the fundamental output voltage value and significantly effecting the quality of the output voltage waveform.

As described in more detail hereinbelow, a system control module 22 of the M2LC system 10 may be utilized to control the degree of phase shift of the M2LC cell switching functions in the arm used to generate the required fundamental output voltage. As a result, the fundamental spectral component of each of the M2LC cell switching functions is essentially identical and independent of the degree of phase shift used to control the capacitor ripple voltage. Further, the non-fundamental spectral components of the M2LC cell switching functions are also essentially identical except that they cancel in various degrees depending on the value of phase shift.

The system control module 22 may utilize either of two basic forms of modulation to control the degree of phase shift of the M2LC cell switching functions, either multi-level sine/pulse width modulation (PWM) or multi-level Space Vector. The system control module 22 may be configured to modify either of these modulation techniques to implement the phase shifting function described hereinabove.

Figures 5A, 5B:
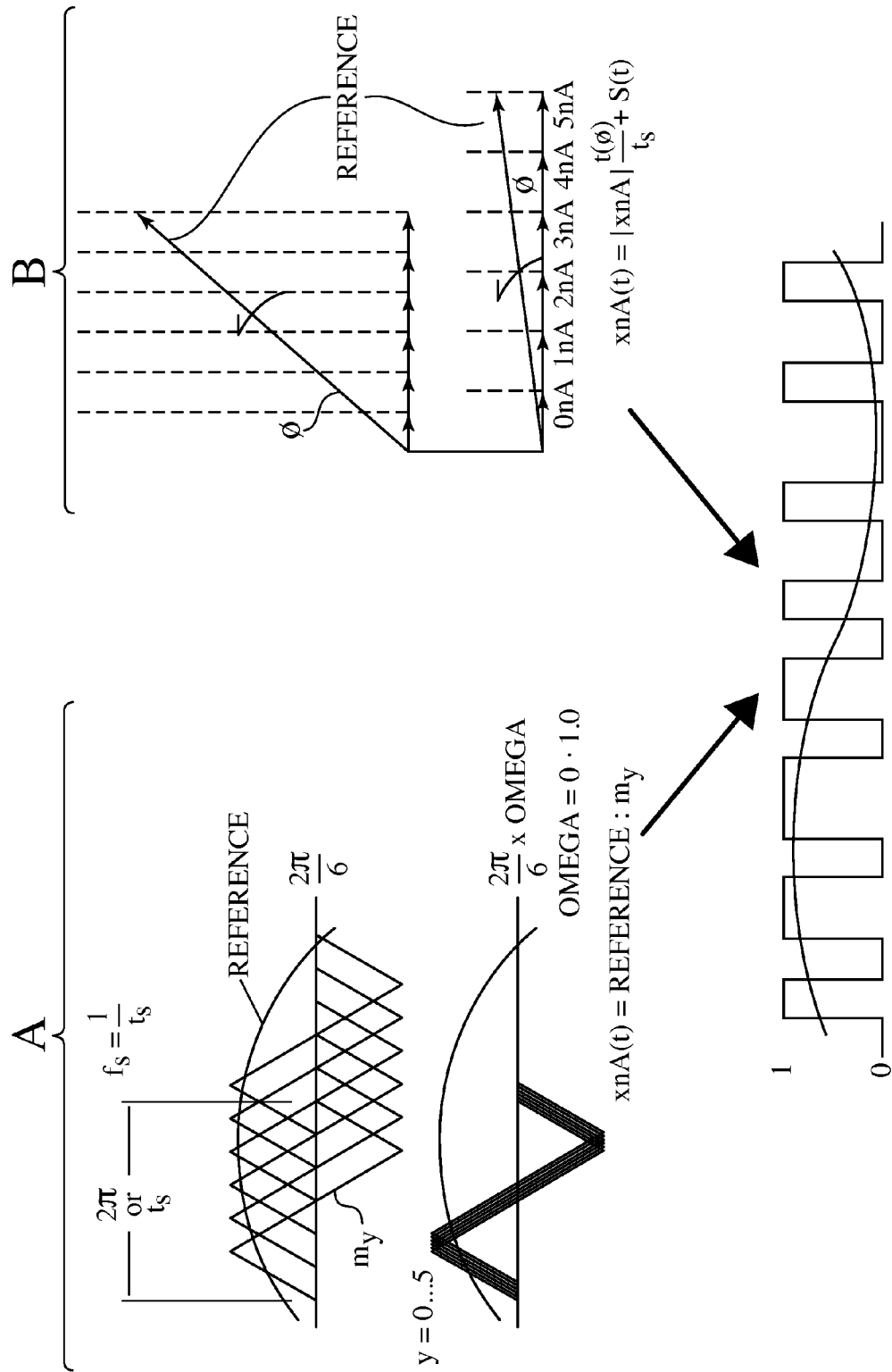
FIGS. 5A and 5B illustrate high level representations of the functionality of a system control module of the M2LC system of FIG. 2 according to various embodiments.

FIGS. 5A and 5B illustrate a high level representation of the functionality of the system control module 22 of the M2LC system 10 according to various embodiments. The system control module 22 (or its functional equivalent) may be utilized to generate the desired M2LC cell switching functions. FIG. 5A shows how a multi-level sine/PWM modulation technique may generate the M2LC cell switching function to control capacitor voltage ripple and FIG. 5B shows how a multi-level space vector modulation technique may generate the M2LC cell switching function to control capacitor voltage ripple.

The system control module 22 may be implemented in hardware, firmware, software and combinations thereof, and may reside at a higher level controller (the hub controller) of the M2LC system 10. According to other embodiments, the system control module 22 may be distributed amongst one or more of the local control modules 20 of the M2LC cells 12. For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. For embodiments where the system control module 22 is embodied as software (e.g., software application, computer program), the software may be stored on a computer-readable medium (e.g., disk, device, and/or propagated signal) such that when a computer reads the medium, the functions described herein are performed.

In FIG. 5A, a classic multilevel PWM modulator is modified to control the degree of phase shift between carrier waveforms using a simple scalar function (Omega) which can be controlled between the values 0 and 1. When Omega=0, the multilevel modulator causes the M2LC cells to switch together like a classic two-level bridge. This produces the minimum value of capacitor voltage ripple in the same way a two-level bridge causes the fundamental current in its arms to cancel. When Omega=1.0, optimum multilevel modulation is achieved if as shown the triangle waveforms are evenly spaced by the value of 2Π/N where N=6 in this example. In this case the M2LC cell capacitors will produce a value of voltage ripple consistent with the operating frequency and output current level and no fundamental current cancellation in the M2LC cell capacitors occurs.

In practice, Omega may be controlled between 0.1 and 1.0. At 0.1 (used for DC starting or very low output frequency machine control), significant fundamental ripple voltage is cancelled (assuming that the resonant frequency of the arm is greater than the switching frequency). Even though significant common mode voltage is produced at the switching frequency of the M2LC cells 12, the output waveform still exhibits degrees of multilevel switching. In fact, even at Omega=0.1, the dv/dt of the switches is the same as in the Omega=1.0 condition.

In FIG. 5B, State Vector Modulation is utilized to control the degree of phase shift. In this case, a set of essentially identical M2LC cell switching functions are produced by computing the time average switch function which most closely fits the desired reference in the particular sample time.

Note that in either case, it is the act of phase shifting these M2LC cell switching functions which produces a "window" of time in which the output terminal controlled by the M2LC cells 12 is either completely connected to the positive DC bus and alternatively the negative DC bus. It is during these "windows" which the fundamental current component in the M2LC cell filter capacitors can be canceled assuming that the resonance frequency of the arm is greater than the cell switching frequency and hence the frequency of the "windows". Smaller time windows (larger values of Omega) are less effective in canceling the fundamental current in the filter capacitors of the M2LC cells 12 but a higher degree of output voltage waveform is achieved. It is in this way Omega can be varied depending on output fundamental frequency of the M2LC system 10 to both optimize capacitor voltage ripple and output voltage quality (so called Harmonic Voltage Factor or HVF).

Simulations

Simulations were performed for a seven-level M2LC system (6 switching M2LC cells per arm) using the dynamic model described in FIG. 4. Four cases were simulated for the M2LC system operating at 30 Hz (typical mid range frequency), and an M2LC cell switching frequency of 600 Hz, all operating at rated output current.

In first 3 simulations, the size of the inter-arm inductance (L) was sized with the M2LC cell filter capacitors so that the phase resonant frequency (fr) is approximately 1.5 times the switching frequency or about 900 Hz. Phase shifts produced by the modulation scheme depicted in FIG. 5A corresponding to Omega=1.0, 0.5 and 0.1 were simulated. It will be appreciated that these conditions could also be developed in theory by the Space Vector scheme shown in FIG. 5B.

In a fourth simulation with Omega=0.1, the phase inductance (L) was increased to show that fundamental current cancelation is ineffective in either modulator technique (or any other common mode cancellation technique) unless the resonance of the phase is sufficiently greater than cell switching frequency (fc) or the resultant two-level window switching frequency of the phase.

Simulation 1

Figure 6A:
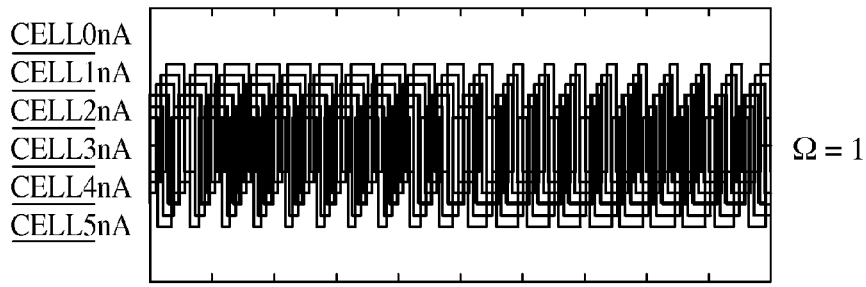
FIGS. 6A-9D illustrate results of simulations for a seven-level M2LC system at various operating conditions.
Figure 6B:
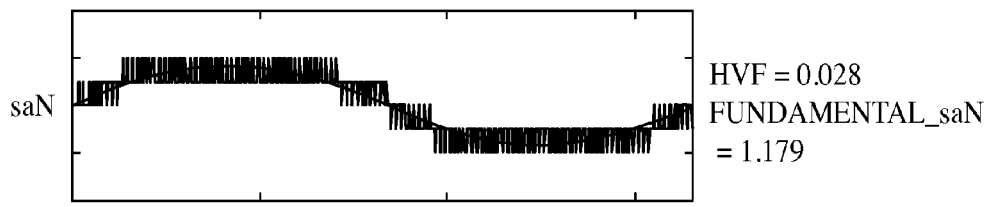
Figure 6C:
Figure 6D:
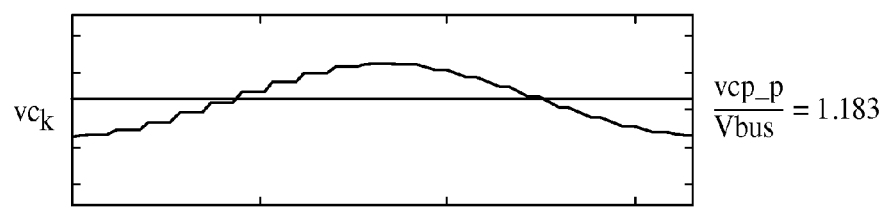

FIGS. 6A-6D show the results for the first simulation, where $f_{out}$=30 Hz, $f_c$=600 HZ, $f_r$=930 HZ, and Omega=1.0. As shown in these figures, the M2LC cell switching functions (FIG. 6A) were essentially identical (same fundamental and harmonics) but were optimally phase shifted to produce the highest quality output voltage (HVF=0.028) and the fundamental value of the switch functions was 1.179 (FIG. 6B). As shown in FIG. 6D, the filter capacitor voltage ripple was nearly 20% (1.183) of the average capacitor voltage.

Simulation 2

FIGS. 7A-7D show the results for the second simulation, where $C_{out}$=30 Hz, $f_c$=600 HZ, $f_r$=930 HZ, and Omega=0.5. As shown in these figures, the M2LC cell switching functions (FIG. 7A) were still essentially identical but phase shift is reduced by 50%. The Harmonic Voltage Factor (FIG. 7B) actually improved but the fundamental value of the switch functions stayed the same. The filter capacitor voltage ripple (FIG. 7D) was nearly 12% (1.117) or almost half the value as in Simulation 1.

Figure 7A:
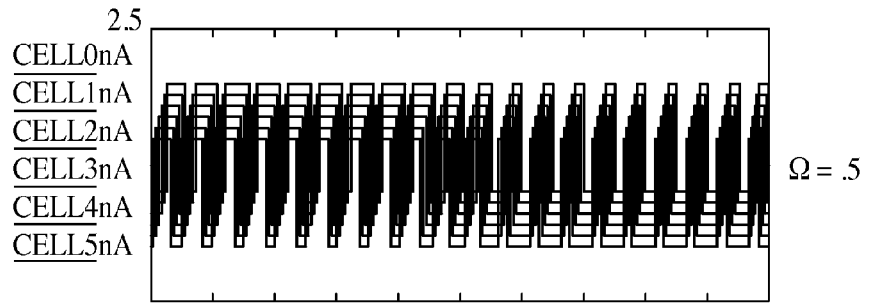
Figure 7B:
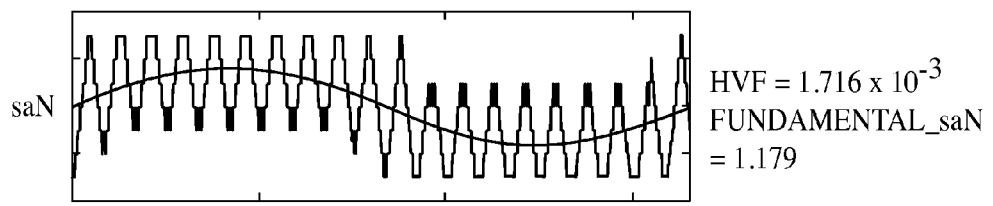
Figure 7C:
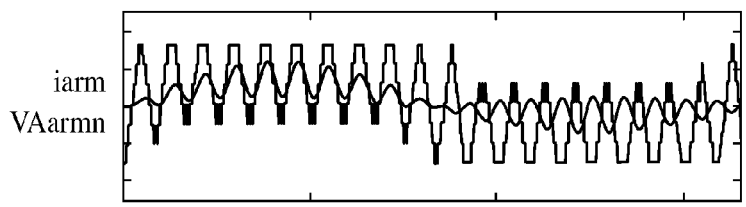
Figure 7D:
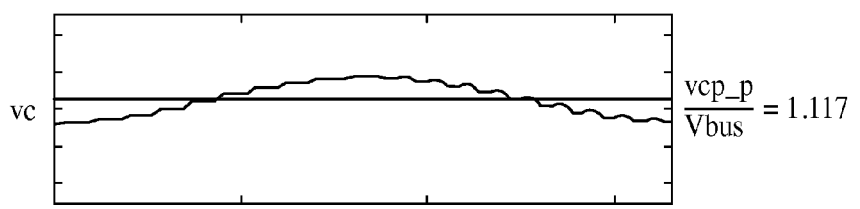
Figure 8A:
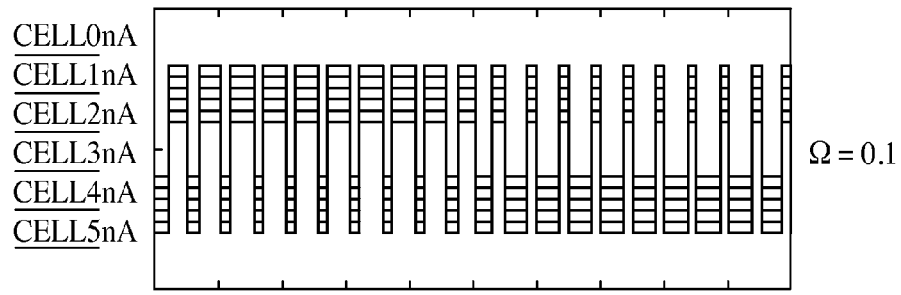
Figure 8B:
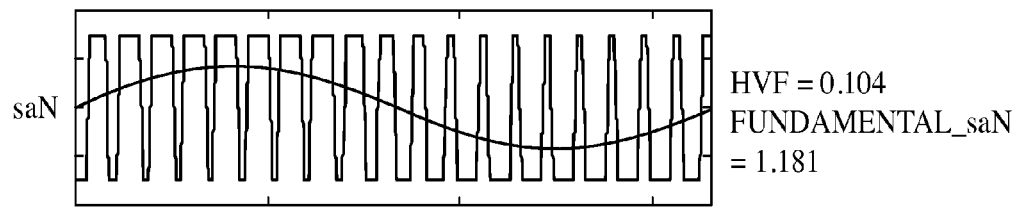
Figure 8C:
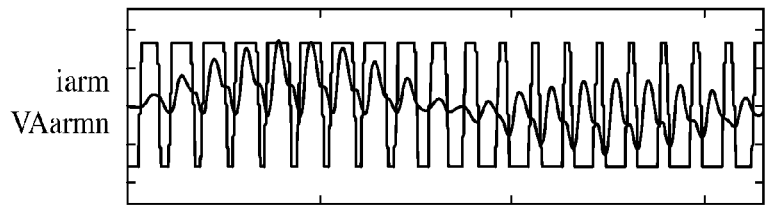
Figure 8D:
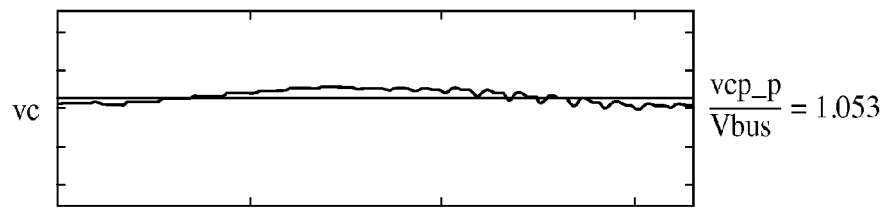
Figure 9A:
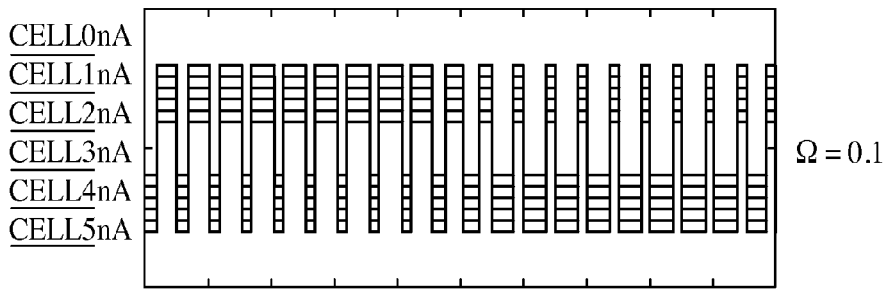
Figure 9B:
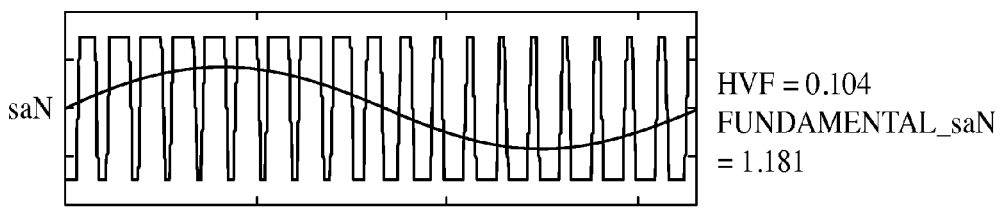
Figure 9C:
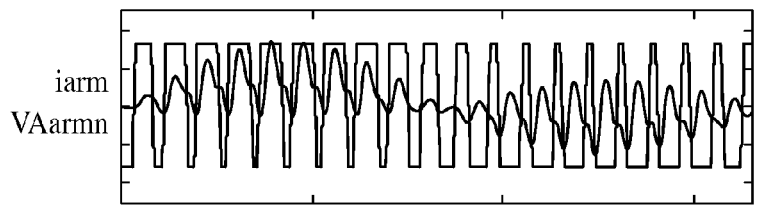
Figure 9D:
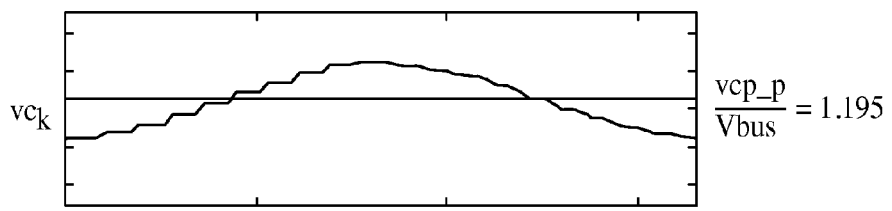

Note the resonant nature of the arm current (iarm) in FIG. 7C in relation to the arm voltage (VAarm) as compared to FIG. 6C. The fundamental current was essentially canceling at the positive and negative DC busses of the M2LC system. The price here however was slightly higher peak currents in the switches.

Simulation 3

FIGS. 8A-8D show the results for the third simulation, where $f_{out}$=30 Hz, $f_c$=600 HZ, $f_r$=930 HZ, and Omega=0.1. As shown in these figures, the M2LC cell switching functions (FIG. 8A) were reduced to 10%. The Harmonic Voltage Factor (FIG. 8B) further improved but the fundamental value of the switch functions (FIG. 8B) stayed essentially the same as in the previous 2 simulations. The filter capacitor voltage ripple (FIG. 8D) was only 5% of the cell capacitor average voltage. Note that this low level of output voltage ripple will occur down to very low output frequencies (even DC) at rated current.

Simulation 4

FIGS. 9A-9D show the results for the fourth simulation, where $f_{out}$=30 Hz, $f_c$=600 HZ, $f_r$=160 HZ, and Omega=0.1. For this simulation, the inter-arm inductance was increased to a value which caused the resonate frequency of the phase to be less than the cell switching frequency. Otherwise, Simulation 4 utilized the same operating condition utilized in Simulation 3. As shown in these figures, the fundamental capacitor current cancellation effect of the phase shifted cell switching functions (FIG. 9D) was completely eliminated when the phase resonate frequency became even slightly less than the phase window "+bus to −bus" switching frequency which results from the M2LC cell switching period when the M2LC cell switch functions are phase shifted. This was also evident by the fact that the arm current in FIG. 9C was no longer excited by the switching frequency as it was in FIG. 8C.

In view of the above, it will be appreciated that when utilized in conjunction with the above-described modulation technique and the selection of the resonate frequency of the phase greater than the M2LC cell switching frequency, the M2LC system 10 is able to be utilized with synchronous machines under rated torque conditions.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A modular multilevel converter system, comprising:
    a plurality of series connected two-terminal M2LC cells arranged into at least two output phase modules, a first one of the output phase modules having an inductance and an effective capacitance associated therewith, wherein the first one of the output phase modules is configured so that a natural resonant frequency of the inductance with the effective capacitance of the first one of the output phase modules is greater than at least one of the following:
    an operating frequency of the first one of the output phase modules;
    a switching frequency of the first one of the output phase modules; and
    a switching frequency of any of the M2LC cells of the first one of the output phase modules; and
    further comprising a system control module communicably connected to the M2LC cells of the first one of the output phase modules;
    wherein the system control module is configured to apply phase-shifted switch functions to the M2LC cells of the first one of the output phase modules, wherein the degree of phase shift is determined by a scalar function having a value between 0 and 1.

2. A modular multilevel converter system, comprising:
    a plurality of series connected two-terminal M2LC cells arranged into at least two output phase modules, a first one of the output phase modules having an inductance and an effective capacitance associated therewith, wherein the first one of the output phase modules is configured so that a natural resonant frequency of the inductance with the effective capacitance of the first one of the output phase modules is greater than at least one of the following:
    an operating frequency of the first one of the output phase modules;
    a switching frequency of the first one of the output phase modules; and
    a switching frequency of any of the M2LC cells of the first one of the output phase modules; and
    further comprising a system control module communicably connected to the M2LC cells of the first one of the output phase modules;
    wherein the system control module is configured to apply:
    a first switch function to a first M2LC cell of the first one of the output phase modules; and
    a second switch function to a second M2LC cell of the first one of the output phase modules, wherein the second switch function is phase shifted relative to the first switch function, and wherein the degree of phase shift is determined by a scalar function having a value between 0 and 1.

3. The system of claim 2, wherein respective fundamental spectral components of the first and second switch functions are essentially equal in magnitude and phase.

4. The system of claim 3, wherein the respective fundamental spectral components of the first and second switch functions are independent of a value of the phase shift.

5. A modular multilevel converter system, comprising:
    a plurality of series connected two-terminal M2LC cells arranged into at least two output phase modules, wherein a first one of the output phase modules defines a total value of inductance and comprises;
    a positive arm; and
    a negative arm; and
    a control system module communicably connected to the two-terminal M2LC cells of the first one of the output phase modules, wherein the control system module is configured to minimize a fundamental output frequency voltage ripple of filter capacitors of the M2LC cells of the first one of the output phase modules;
    wherein the control system module is configured to apply phase-shifted switch functions to the M2LC cells of the first one of the output phase modules, wherein the degree of phase shift is determined by a scalar function having a value between 0 and 1.

6. A modular multilevel converter system, comprising:
    a plurality of series connected two-terminal M2LC cells arranged into at least two, output phase modules, wherein a first one of the output phase modules defines a total value of inductance and comprises;
    a positive arm; and
    a negative arm; and
    a control system module communicably connected to the two-terminal M2LC cells of the first one of the output phase modules, wherein the control system module is configured to minimize a fundamental output frequency voltage ripple of filter capacitors of the M2LC cells of the first one of the output phase modules;

wherein the system control module is configured to apply:

a first switch function to a first M2LC cell of the first one of the output phase modules; and a second switch function to a second M2LC cell of the first one of the output phase modules, wherein the second switch function is phase shifted relative to the first switch function, and wherein the degree of phase shift is determined by a scalar function having a value between 0 and 1.

7. The system of claim 6, wherein respective fundamental spectral components of the first and second switch functions are essentially equal in magnitude and phase.

8. The system of claim 7, wherein the respective fundamental spectral components of the first and second switch functions are independent of a value of the phase shift.

9. A modulation method for an M2LC system, the method comprising:

inducing a common mode voltage at a switching frequency of an M2LC output phase module to minimize fundamental current and resulting voltage ripple of subsystem filter capacitors at low operating frequencies;

applying a first switch function to a first M2LC cell of an arm of a first output phase module of the M2LC system;

applying a second switch function to a second M2LC cell of the arm of the first output phase module of the M2LC system, wherein the second switch function is phase shifted relative to the first switch function, wherein the degree of the phase shift is determined at least in part by a scalar function.

10. The method of claim 9, wherein applying the first and second switch functions comprises applying respective fundamental spectral components of the first and second switch functions which are essentially equal in magnitude and phase.

11. The method of claim 9, wherein the respective fundamental spectral components of the first and second switch functions are independent of a value of the phase shift.

12. The method of claim 9, further comprising controlling an amount of phase shift between the first and second switch functions using the scalar function with a value between 0 and 1.

13. The method of claim 9, further comprising applying a third switch function to a third M2LC cell of the arm of the first output phase module of the M2LC system, wherein the third switch function is phase shifted relative to the first and second switch functions.

14. The method of claim 13, wherein respective fundamental spectral components of the first, second and third switch functions are essentially equal in magnitude and phase.

15. The method of claim 14, wherein the fundamental spectral components of the first, second and third switch functions are independent of values of the respective phase shifts.

16. The method of claim 13, further comprising controlling an amount of phase shift between the second and third switch functions.

* * * * *